United States Patent
Kino et al.

(10) Patent No.: US 6,959,678 B2
(45) Date of Patent: Nov. 1, 2005

(54) AIR INTAKE APPARATUS AND MANUFACTURING METHOD THEREFOR

(75) Inventors: Hitoshi Kino, Aichi (JP); Hiroshi Iwao, Aichi (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 11 days.

(21) Appl. No.: 10/803,919

(22) Filed: Mar. 19, 2004

(65) Prior Publication Data

US 2004/0187826 A1 Sep. 30, 2004

(30) Foreign Application Priority Data

Mar. 27, 2003 (JP) .................................. P2003-087657

(51) Int. Cl.$^7$ .................. F02M 35/10; F02M 35/00; B65B 7/00
(52) U.S. Cl. .................. 123/184.53; 181/229; 181/247; 156/69; 156/294
(58) Field of Search .................. 123/184.53; 181/229, 181/247; 156/69, 294

(56) References Cited

U.S. PATENT DOCUMENTS 6,517,595 B2    2/2003   Kino et al.

FOREIGN PATENT DOCUMENTS

JP    A-2001-193587    7/2001

*Primary Examiner*—Noah P. Kamen
(74) *Attorney, Agent, or Firm*—Posz Law Group, PLC

(57) ABSTRACT

The manufacturing method for the air intake apparatus has a holding-portion forming step, a temporarily fixing step, and a joining step. In the holding-portion forming step, a holding portion is formed. In the temporarily fixing step, the porous member is held by the holding portion. In the joining step, the holding portion and the porous member are joined together. Thus, an air intake apparatus, in which the opening is reliably covered with the porous member, can be manufactured. In the air intake apparatus manufactured by this manufacturing method, a peripheral portion of the porous member is doubly sealed with the holding portion that is an outer edge part of the opening. Consequently, the opening is reliably covered with the porous member, so that intake noise is reliably reduced.

13 Claims, 7 Drawing Sheets

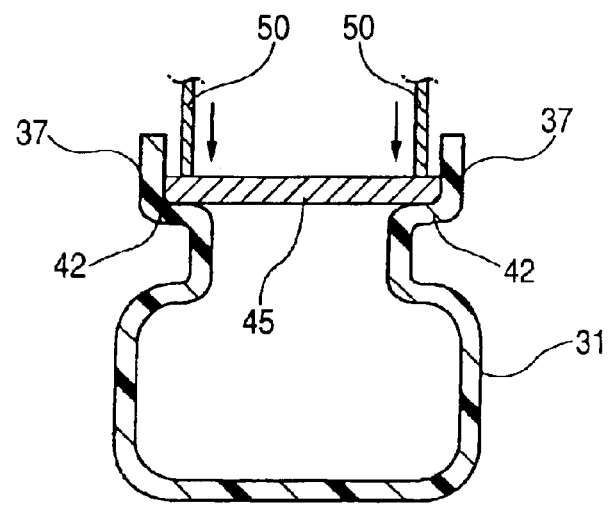
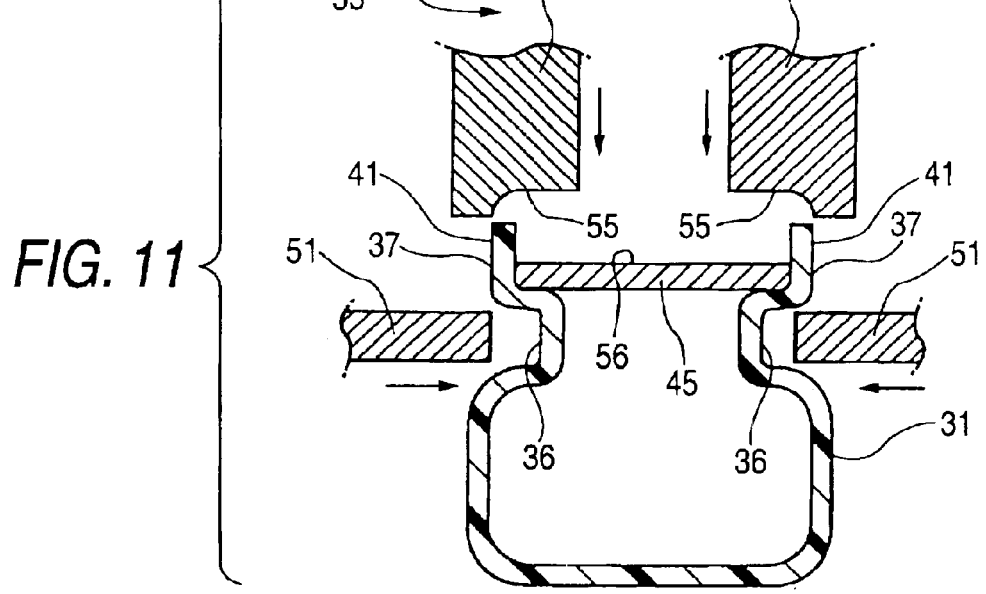

AIR INTAKE APPARATUS AND MANUFACTURING METHOD THEREFOR

The present application is based on Japanese Patent Application No. 2003-087657, which is incorporated herein by reference.

BACKGROUND OF THE INVENTION

1. Field of the Invention

The present invention generally relates to an air intake apparatus serving as a passage for supplying air to an engine, and also relates to a manufacturing method therefor. More particularly, the invention relates to an air intake apparatus in which noise generated at the time of air intake is reduced, and to a manufacturing method therefor.

2. Description of the Related Art

In an air intake system of an engine, air taken in from an introduction port of an engine body is supplied to an engine body through an air intake passage portion connected from this introduction port to the engine body. This intake passage portion is provided with an air intake duct communicating with the introduction port. Generally, this intake passage portion is also provided with various intake members, such as an air cleaner, a throttle body, and an intake manifold, together with the intake duct. These intake members constitute a part of the intake passage portion.

Incidentally, in this intake apparatus, noise is generated in the intake passage portion during air intake. This noise leaks out of the intake apparatus from the introduction port, and propagates to the inside or outside of a passenger compartment. Therefore, hitherto, various means for reducing this intake noise have been developed.

A technique of providing an opening in a part of the intake passage portion and covering this opening with a porous member is known as means for reducing intake noise (see, for example, Unexamined Japanese Patent Publication No. 2001-193587). As described in this publication, noise can be reduced by forming an opening in a part of the intake passage hole and integrally covering this opening with a porous member. A reason therefor is considered as a synergistic effect of the following actions.

(1) Damping action due to elasticity of the porous member. Generation of acoustic waves due to vibrations of the intake passage portion is restrained.
(2) Action of viscosity and thermal conductivity of fine pores, which weakens energy of acoustic waves that get in fine pores of the porous member. The fine pores themselves resonate with variation in acoustic pressure, so that acoustic energy is attenuated.
(3) Action of a certain degree of air permeability that at least a part of the intake passage portion has. A part of acoustic waves passes through the part of the intake passage portion, so that the generation of standing waves is restrained.

Incidentally, according to a method of manufacturing an air intake apparatus as described in the aforementioned JP 2001-193587, the opening is covered with the porous member by heating and welding a peripheral portion of the opening and then pushing the porous member against the heated and molten portion. In this case, molten resin permeates into fine pores of the porous member. Then, the molten resin is solidified in the fine pores. Thus, the solidified resin serves as an anchor. Consequently, welding between the porous member and the intake passage portion can favorably be performed.

Meanwhile, it is necessary for reliably reducing intake noise to cover the opening with the porous member without leaving spaces therein. That is, in the case where an outer edge of the opening is not reliably sealed with the porous member, and where a part directly communicating with the outside of the intake passage portion is provided in the opening, pressure leaks from this unsealed part. Therefore, intake noise is not reduced. On the contrary, noise due to vibrations of the porous member itself sometimes occurs.

It is necessary for reliably sealing the outer edge of the opening with the porous member to dispose the porous member at a place corresponding to the opening when pushing the porous member against the opening. However, for instance, when the opening is provided in a curved surface of the intake passage portion, the opening has a curved shape. Thus, it is sometimes difficult to securely place the porous member against the opening. Therefore, in such a case, it is necessary that the porous member is disposed at a place corresponding to the opening, and that the placement position of the porous member with respect to the opening is regulated in some way.

The aforementioned JP 2001-193587 discloses a related method of pushing the porous member while the porous member is held by a porous-member receiving jig, which is separately prepared, so as to regulate a position, at which the porous member is disposed, with respect to the opening. However, there is necessity for forming such a porous-member receiving jig in such a way as to have a shape suited to that of the intake passage portion, in which the opening is formed, so as to place the porous member along the outer edge of the opening that has a three-dimensional shape. Therefore, this related method has problems in that a same porous-member receiving jig cannot be adapted to variously shaped intake apparatuses, and that the manufacturing cost of the apparatus thereof increases. Alternatively, according to another related method of covering the opening with the porous member by pushing the porous member against a preliminarily molten peripheral portion of the opening, the peripheral portion and the porous member once pushed thereagainst are instantaneously welded together. Thus, this related method has a problem in that because the placement position of the porous member cannot be corrected even when that of the porous member with respect to the opening is displaced, a manufacturing loss occurs, and that the manufacturing cost of the apparatus increases.

SUMMARY OF THE INVENTION

The invention is accomplished in consideration of the aforementioned circumstances. Accordingly an object of the invention is to provide an air intake apparatus, which is adapted so that the outer edge of the opening is reliably sealed with the porous member, and which is manufactured at low cost regardless of the shape of the outer edge of the opening, and to provide a manufacturing method therefor.

To achieve the foregoing object, according to an aspect of the invention, there is provided a method (hereunder referred to as a first method of the invention) of manufacturing an air intake apparatus that has an air intake passage portion constituting a path of flow of air introduced into an internal combustion engine, and that also has an opening, which is formed in at least a part of the air intake passage portion, for communicating the outside and the inside thereof, and a porous member for covering the opening. This method comprises a holding-portion forming step of forming the opening in the air intake passage portion, and also forming a holding portion, which projects toward the outside of the air intake passage portion and is shaped substantially like a ring, in an outer edge part of the opening, a temporarily fixing step of temporarily fixing the porous member by inserting the porous member into the holding portion and by causing the holding portion to hold the porous member, and a joining step of joining the porous member and the holding portion during a state in which the porous member is temporarily fixed in the groove part.

According to the first method of the invention, the porous member is held by the holding portion in the temporarily fixing step. Thus, the opening can reliably be covered with the porous member without using any special jig.

According to an embodiment (hereunder referred to as a second method of the invention) of the first method of the invention, the joining of the porous member and the holding portion is performed by welding thereof in the joining step. Alternatively, the joining of the porous member and the holding portion may be performed by thermal caulking thereof in the joining step.

According to an embodiment (hereunder referred to as a third method of the invention) of the first or second method of the invention, the holding portion has a shape substantially like a ring extending along an outer edge of the opening and also has a bottom holding part, which holds a part of the bottom surface of the porous member, and a side holding part that projects from an outer edge of the bottom holding part to the outside of the air intake passage portion and that holds at least a part of a side surface of the porous member. In the temporarily fixing step, at least two surfaces of the porous member are held by the holding portion.

According to an embodiment (hereunder referred to as a fourth method of the invention) of one of the first to third methods of the invention, the holding portion has a shape substantially like a ring extending along an outer edge of the opening and also has a bottom holding part that holds a part of the bottom surface of the porous member, a side holding part that projects from an outer edge of the bottom holding part to the outside of the air intake passage portion and that holds at least a part of a side surface of the porous member, and a top holding part that projects from a projecting end of the side holding part and that extends in the direction of a diameter of the ring. The bottom holding part, the side holding part, and the top holding part are disposed so that cross sections of the bottom holding part, the side holding part, and the top holding part are arranged in a substantially U-shaped configuration in such a way as to have a groove part provided in an inner peripheral part of the holding portion. In the temporarily fixing step, the porous member is held in the porous member is held in the groove part of the holding portion.

According to another aspect of the invention, there is provided an air intake apparatus having an air intake passage portion constituting a path of flow of air introduced into an internal combustion engine, and also having an opening, which is formed in at least a part of the air intake passage portion, for communicating the outside and the inside thereof, and a porous member for covering the opening. In this apparatus, a holding portion, which projects toward the outside of the air intake passage portion and is shaped substantially like a ring, is formed in an outer edge part of the opening. The holding portion has a substantially U-shaped cross section and also has a groove part provided in an inner peripheral part thereof. The porous member is joined and integrally formed with the holding portion so that a peripheral portion of the porous member is held in the groove part.

According to the air intake apparatus of the invention, the porous member is joined and integrally formed with the holding portion so that a peripheral portion of the porous member is held in the groove part. Thus, the peripheral portion of the porous member is doubly sealed with the holding portion that constitutes an outer edge part of the opening. Consequently, the opening can reliably be covered with the porous member.

BRIEF DESCRIPTION OF THE DRAWINGS

In the accompanying drawings:

FIG. 10 is another schematic view illustrating the temporarily fixing step of the method of manufacturing an air intake apparatus according to the second embodiment of the invention;

FIG. 11 is a schematic view illustrating a joining step of the method of manufacturing an air intake apparatus according to the second embodiment of the invention;

DETAILED DESCRIPTION OF THE PREFERRED EMBODIMENTS

Figure 1:
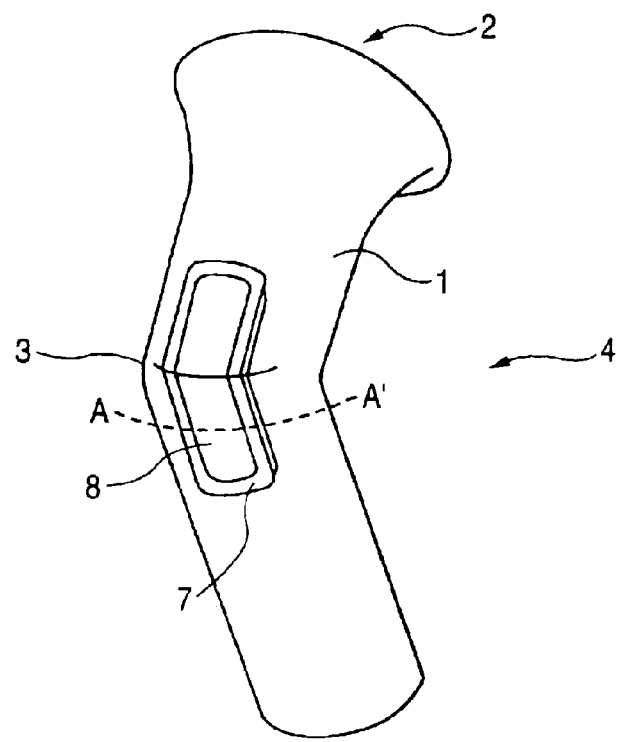
FIG. 1 is a schematic view showing an air intake apparatus according to a first embodiment of the invention.

A manufacturing method for an air intake apparatus according to the invention is to manufacture an air intake apparatus having an air intake passage portion, an opening, and a porous member.

The air intake passage portion is a part of the air intake apparatus, which constitutes a path of flow of air introduced into an internal combustion engine. According to the invention, various air intake members, such as an air intake duct, a resonator, an air cleaner, an air cleaner hose, a throttle body, and an intake manifold, can suitably be selected and disposed in the air intake passage portion. Incidentally, according to the air intake apparatus of the invention, intake noise can be reduced as will be described later. Therefore, no resonator may be disposed therein. Alternatively, it is sufficient for the intake apparatus to provide only a small resonator therein.

Such an air intake apparatus can be formed by using various known resin materials. For example, resins, such as PP, PE, PA, or materials obtained by mixing fiber glass or talc with such resins are preferably used as the resin materials. The air intake passage portion can be molded by a known resin-molding method. For instance, a resin injection molding method and a resin blow molding method are preferably employed as the resin-molding method.

The opening is bored in a part of the air intake passage portion. This opening is provided in such a way as to communicate the inside and the outside of the air intake passage portion, and serves as an emission hole from which intake sound generated in the intake passage portion is emitted to the outside thereof. This opening restrains the generation of standing waves derived from the opening, as described above.

This opening is covered with the porous member. This prevents a foreign matter from entering the intake passage portion from the outside through the opening, and causes the aforementioned porous member to perform a vibration damping action and an energy damping action thereby to reduce transmitted sound to be emitted to the outside of the opening. In the apparatus according to the invention, a part, in which the opening is provided, in the air intake passage portion is not limited to a specific one. That is, according to the invention, the opening can be provided in a desired place of each of various air intake members constituting the aforementioned air intake passage portion.

A member, which is formed of various kinds of fibers, filter paper, or open-cell foam and has desired air permeability, can suitably be selected and used as the porous member. Particularly preferably, nonwoven fabric, woven fabric, or knitted fabric is used as the porous member. Thermoplastic resin nonwoven fabric can easily be shaped by using, for example, a thermal pressing method. Therefore, even when the intake passage portion has a complex shape and the opening thus has a curved form, the porous member can easily be shaped into a form corresponding to and fitted in the shape of this opening. Incidentally, either the entirety or a part of the nonwoven fabric, the woven fabric or the knitted fabric may be formed of thermoplastic resin fibers. For example, when the porous member is constituted by nonwoven fabric formed by impregnating nonthermoplastic fabric with a thermoplastic resin binder, this porous member can easily be shaped by, for example, a thermal pressing method, similarly to the case of forming the entire nonwoven fabric of thermoplastic resin fiber.

The thickness and the properties of the porous member may change owing to a secular variation thereof and to ingression of moisture thereinto. This results in loss of the balance between the sound transmitted through the opening to the outside of the porous member and the intake sound emitted from the introduction port to the intake passage portion. Consequently, capability to suppress intake noise may change. Therefore, it is desirable that the porous member has predetermined capabilities, such as antiweatherability and water-shedding ability. Such capabilities can be imparted to the porous member by forming the entire porous member of materials, which enable the porous member to perform the predetermined capabilities, or by providing a functional layer, which enables the porous member to perform the predetermined capabilities, in at least a part of the porous member.

The larger the placement area of the opening, the larger the action of reducing intake noise. However, because the porous member for covering the opening is expensive, it is preferable for suppressing the cost of materials of the intake apparatus to provide a transmitting port, the area of which is small, in the intake passage portion. Therefore, according to the invention, the placement area of the transmitting port is appropriately set by taking the manufacturing cost, the maintenance cost, and the intake sound of the apparatus into consideration.

A pair of the opening and the porous member can be provided at either a single position or each of a plurality of positions. In the case where a plurality of sets of the opening and the porous member are provided at a plurality of positions, noise can more reliably be suppressed by simultaneously providing the plurality of sets of the opening and the porous member at various places, at each of which an associated set of the opening and the porous member provides a noise suppressing effect, in the intake passage portion.

A method of manufacturing an air intake apparatus according to the invention comprises a holding-portion forming step, a temporarily fixing step, and a joining step.

The holding-portion forming step is a step of forming the opening in the air intake passage portion and also forming a holding portion, which projects toward the outside of the air intake passage portion and is shaped substantially like a ring, in an outer edge part of the opening. The holding portion can be formed by the aforementioned various molding methods. The opening can be formed by various methods respectively corresponding to the various molding methods. For example, in the case that the intake passage portion is formed by the blow molding method, a part, in which the opening is provided, is formed like a bag. The opening can be formed by cutting off this part. For instance, in the case that the intake passage portion is formed by injection molding, the opening can be formed simultaneously with the forming of the intake passage portion. Alternatively, the opening can be cut-formed therein after the forming of the intake passage portion. The method of forming the opening is not limited thereto. The opening can be formed by various other known methods.

In the holding-portion forming step, the holding portion protruding to the outside of the intake passage portion is formed in the outer edge part of the opening. The holding portion is a part that is shaped substantially like a ring extending along the shape of the outer edge of the opening and that constitutes an outer edge part of the opening. When the intake passage portion is molded, the holding portion can simultaneously be formed. Alternatively, after the intake passage portion and the holding portion are formed independent of each other as separate parts, the intake passage portion and the holding portion can be integrated into one unit by known methods, such as welding and adhesivebonding. Alternatively, the intake passage portion and the holding portion can be integrated into one unit by a method, such as insert-molding.

It is sufficient for the holding portion to have a shape adapted so that the porous member is inserted thereinto in the temporarily fixing step (to be described later), that the inserted porous member is held therein, that the shape is substantially like a ring, and that the inside of the ring communicates with the opening. Therefore, the shape of the holding portion is not limited to a specific one. However, it is preferable for facilitating the holding of the porous member that the shape enables the holding of the porous member by methods of putting the porous member thereon and of supporting the porous member from both sides thereof.

The temporarily fixing step is a step of inserting the porous member into the holding portion and causing the holding portion to hold the porous member. As described above, the holding portion may have various shapes. Therefore, this temporarily fixing step is performed according to the shape of the holding portion. The porous member is held by the holding portion, which constitutes the outer edge part of the opening, by performing the temporarily fixing step. Thus, the placement position of the porous member with respect to the opening is regulated by the holding portion. Incidentally, in this temporarily fixing step, the porous member is merely held by the holding portion and temporarily fixed to a position corresponding to the opening. Hence, in the case where the placement position of the porous member with respect to the opening is displaced, the porous member can be removed from the holding portion. Consequently, the placement position of the porous member can easily be corrected.

In this temporarily fixing step, the porous member and the holding portion may be partly welded to thereby cause the holding portion to more securely hold the porous member. At that time, this partial welding is performed in a state in which the porous member is held by the holding portion. Therefore, a special jig for regulating the placement position of the porous member with respect to the opening is unnecessary. This partial welding can be performed by using a highly versatile device, such as an ultrasonic horn for ultrasonic welding.

The joining step is a step of joining the porous member and the holding portion in a state in which the porous member is inserted into the holding portion and temporarily fixed thereto in the temporarily fixing step. In this joining step, the porous member is joined with the holding portion integrally formed with the intake passage portion. Thus, the porous member and the intake passage portion are integrated into one unit. At that time, the placement position of the porous member with respect to the opening is regulated in the aforementioned temporarily fixing step. Consequently, the opening can reliably be covered with the porous member without using a special jig for holding the porous member in the joining step. The joining therebetween is performed after the porous member is temporarily fixed once. Thus, the displacement of the placement position of the porous member with respect to the opening can be corrected in the temporarily fixing step. In the air intake apparatus manufactured through the temporarily fixing step and the joining step, the joining accuracy is enhanced. Consequently, increase in the manufacturing cost thereof due to the manufacturing loss thereof is suppressed.

The holding portion to be joined with the porous member in the joining step constitutes an outer edge part of the opening, so that the outer edge part is reliably covered with the porous member. Thus, an occurrence of a gap between the outer edge part of the opening and the porous member can be prevented. Incidentally, according to the method of manufacturing an air intake apparatus pursuant to the invention, the holding portion of the intake passage portion and the porous member are integrated into one unit by joining thereof. The joining can be performed by known methods. For example, in the case that the joining thereof is performed by welding thereof, a part of the holding portion is molten in the joining step and becomes a molten resin. Then, the molten resin permeates into fine pores of the porous member. Subsequently, the molten resin is solidified in the fine pores. Thus, the solidified resin serves as an anchor. Consequently, the adhesion between the porous member and the intake passage portion can favorably be performed by what is called an anchor effect. This welding can be performed by known methods, such as hot-plate welding, vibration welding, ultrasonic welding, and high-frequency induction welding.

In the case where the joining of the porous member and the holding portion is performed by thermal caulking thereof, no anchor effect of the molten resin is obtained. However, the porous member and the intake passage portion can favorably be performed by heating and pressurizing the holding portion and the porous member inserted thereinto and temporarily fixed thereto.

According to the method of manufacturing the air intake apparatus pursuant to the invention, the porous member can reliably be disposed at a place corresponding to the opening in the temporarily fixing step regardless of the shape of the intake passage portion. This placement of the porous member is performed by being held by the holding portion. Thus, no special jig is needed. In the temporarily fixing step, the porous member is merely temporarily fixed to the holding portion. Therefore, in the case where the placement position of the porous member with respect to the opening is displaced, the placement position thereof can easily be corrected. Subsequently, in the joining step, the porous member and the holding portion for holding the porous member are joined. Thus, the joining of the porous member and the holding portion is performed after the placement position of the porous member with respect to the opening is determined. The sealing of the opening with the porous member can more reliably be performed.

According to the method of manufacturing the air intake apparatus pursuant to the invention, the holding portion can be constituted by a bottom holding part and a side holding part. Thus, in the present specification, the expression "the bottom surface of the porous member" designates a surface thereof, which is placed opposite to the opening and constitutes a part of the inner surface of the air intake apparatus. The expression "a side surface of the porous member" designates a surface thereof continued to the bottom surface thereof. The expression "a surface (to be described later) of the porous member" designates a surface thereof, which is placed opposite to the bottom surface thereof and constitutes an outer surface of the air intake apparatus.

The bottom holding part of the holding portion has a shape that is substantially like a ring extending along the outer edge of the opening, and serves as a part holding a part of the bottom surface of the porous member. That is, the opening is provided in an inner peripheral part of the ring-like bottom holding part. The bottom holding part constitutes an outer edge part of the opening. Thus, the bottom surface of the porous member has a part, which covers the opening, and also has another part held by this bottom holding part.

The side holding part protrudes from an outer edge of the bottom holding part to the outside of the intake passage portion and serves as at least a part of a side surface of the porous member. A protruding direction, in which the side holding part protrudes, is not limited to a specific one as long as this direction is an outward direction of the intake passage portion and is also a direction in which at least a part of a side surface of the porous member. The side holding part may be adapted to protrude in a direction perpendicular to the outer surface of the intake passage portion. Alternatively, the side holding part may be adapted to protrude by being inclined thereto at a predetermined angle. Alternatively, the side holding part may be adapted to protrude therefrom by being bent. This protruding direction can appropriately be set according to the shapes of the intake passage portion, the opening, and the porous member. Incidentally, in the case that the protruding direction and the shape of the side holding part completely correspond to the shape of a side surface of the porous member, the entire side surface of the porous member is held by the side holding part. Conversely, in the case that the protruding direction and the shape of the side holding part do not completely correspond to the shape of a side surface of the porous member, a part of the side surface of the porous member is held by the side holding part.

The joining step is performed in a state in which the bottom holding part and the side holding part hold the porous member. Thus, the side holding part is molten by a joining device, for instance, a welding device, in such a way as to be pushed in the direction of the bottom holding part. The molten side holding part is deformed by this pushing in the direction of the surface of the porous member, so that a layer of the molten side holding part is formed on the surface of the porous member. Therefore, upon completion of performing the joining step, the holding portion has a substantially-U-shaped cross section, in the inner peripheral part of which a groove portion is provided. The porous member is joined and integrated with the holding portion by being held in this groove portion. Consequently, the obtained air intake apparatus is adapted so that the peripheral portion of the porous member is doubly sealed according to the shape of the holding portion. Thus, the opening is more reliably covered with the porous member.

The holding portion is constituted by the bottom holding part and the side holding part. Thus, the porous member is held in the aforementioned temporarily fixing step by the bottom holding part and the side holding part of the holding portion, which hold at least two surfaces, that is, the bottom surface and the side surface of the porous member. Therefore, even in the case where the opening is provided in a curved part of the intake passage portion, the placement of the porous member at a position corresponding to the opening can easily and more reliably be performed.

According to the method of manufacturing the air intake apparatus pursuant to the invention, the holding portion can be constituted by a bottom holding part, a side holding part, and a top holding part. The bottom holding part has a substantially ring like shape and holds a part of the bottom surface of the porous member, similarly as the aforementioned bottom holding part. The side holding part projects from an outer edge of this bottom holding part to the outside of the intake passage portion and holds at least a part of a side surface of the porous member. The top holding part extends from a projecting end of the side holding part in the direction of a diameter of a ring and holds a part of a surface of the porous member. Incidentally, it is necessary that the holding portion is shaped substantially like a ring in which the holding portion communicates with the opening. Thus, the top holding part also has a shape that is substantially like a ring.

The top holding part may be shaped so that when holding the porous member, the top holding part is in contact with the porous member and supports the porous member from both sides thereof together with the bottom holding part. Alternatively, the top holding part may be placed in such a way as to get apart from a surface of the porous member when holding the porous member. Even in the case that the top holding part is placed in such a manner as to get apart from a surface of the porous member, the movement of the porous member in the direction of the outside of the intake passage portion is regulated by the top holding part. Thus, the top holding part achieves the effect of holding the porous member. As long as the shape of the top holding part extends in the direction of a diameter of the ring, the top holding part may be shaped into various forms, such as a plate-like form and a curved form.

In the case that the holding portion is constituted by the bottom holding part, the side holding part, and the top holding part, these parts are placed so that the bottom holding part and the top holding part are connected by the side holding part. Thus, the holding portion has a substantially U-shaped cross section. An inner part having this U-shaped cross section is a groove part of the holding portion. Because the side holding part is a part projecting from the outer edge of the bottom holding part, the groove part is placed on the inner periphery of the substantially-ring-like holding portion. In this case, in the temporarily fixing step, the peripheral portion of the porous member is held in the groove part of the holding portion. Thus, the holding portion can more easily and reliably hold the porous member. Consequently, the invention can enhance ability of the porous member of the obtained air intake apparatus to seal the opening still more. In this case, in the joining step, the top holding part and the side holding part are molten by simultaneously being pushed by the joining device, such as a welding device, in the direction of the bottom holding part. The molten side holding portion is deformed in the direction of a surface of the porous member by this pushing, together with the molten top holding part, so that layers of the molten top holding part and the molten side holding part are formed on the surface of the porous member. Therefore, upon completion of the joining step, the porous member is joined with the holding portion while held in the groove part of the holding portion, and integrated therewith, similarly to the aforementioned case in which the porous member is constituted by the bottom holding part and the side holding part. Thus, in the obtained air intake apparatus, the peripheral portion of the porous member is doubly sealed by the holding portion. Consequently, the sealing of the opening with the porous member is more favorably achieved.

An air intake apparatus according to the invention is that manufactured by the aforementioned method of manufacturing an air intake apparatus according to the invention. Thus, the air intake apparatus of the invention is adapted so that an opening is provided in at least a part of the intake passage portion, and that this opening is covered with the porous member. In the air intake apparatus of the invention, a substantially-ring-like holding portion projecting to the outside of the intake passage portion is formed in the outer edge part of the opening. This holding portion is formed in such a way as to have a substantially U-shaped cross section and as to have a groove part provided in an inner peripheral part thereof. The porous member is joined and integrally formed with the holding portion so that a peripheral portion of the porous member is held in the groove part.

As described above, the porous member is joined and integrated with the holding portion so that the peripheral portion of the porous member is held in the groove part thereof. Thus, the peripheral portion of the porous member is doubly sealed with the holding portion. Consequently, the opening is more reliably covered with a covering member. Thus, according to the air intake apparatus of the invention, intake noise can more reliably be reduced. Hence, increase in the manufacturing cost thereof due to the manufacturing loss thereof can be suppressed.

Hereinafter, preferred embodiments of the invention are described with reference to the accompanying drawings.

First Embodiment

Figure 2:
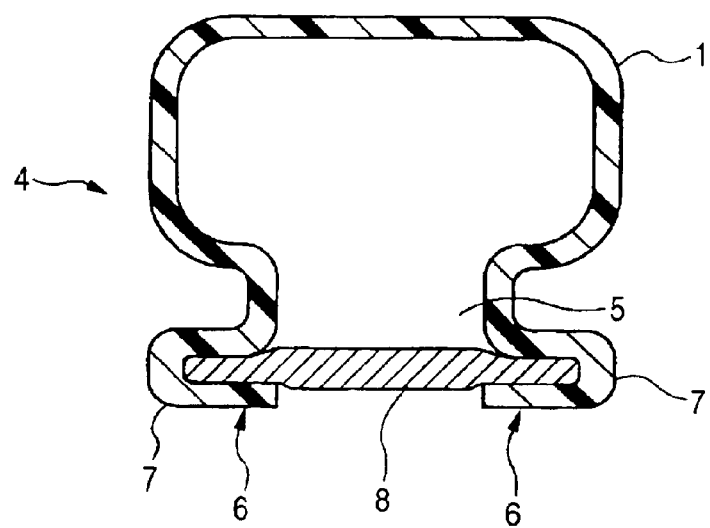
FIG. 2 is a schematic cross sectional view taken on line A–A' of FIG. 1.

A first embodiment of the invention is an example of application of the method of manufacturing an air intake apparatus according to the invention to an air intake duct that is a part of an air intake passage portion of an automobile. Therefore, in the first embodiment, the opening and the porous member are disposed in this air intake duct. The air intake duct, in which the opening and the porous member are placed, is the air intake apparatus according to the invention. FIG. 1 is a schematic perspective view showing the air intake apparatus according to the first embodiment of the invention. FIG. 2 is a schematic cross sectional view taken along line A–A' of FIG. 1.

In the first embodiment, an air intake duct 1 is formed into a curved shape in such a way as to have an introduction port 2 from which intake air is introduced. An opening 5 is provided in a curved surface 3 of this intake duct 1. A holding portion 7 protruding to the outside of the intake duct 1 is formed in an outer edge part 6 of the opening 5. The opening 5 is covered with a porous member 8 welded and integrated with the holding portion 7. Thus, an air intake apparatus 4 is formed.

A method of manufacturing an air intake apparatus according to the first embodiment of the invention is performed by performing the following steps. FIGS. 3 to 7 are schematic views illustrating the method of manufacturing the air intake apparatus according to the first embodiment of the invention.

Holding-Portion Forming Step

Figure 3:
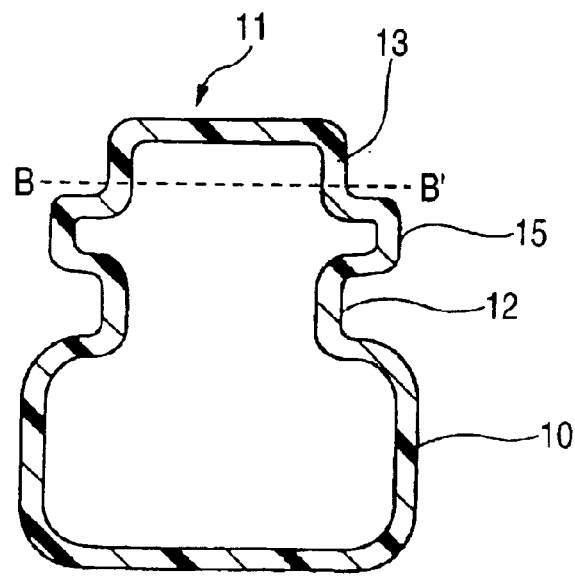
FIG. 3 is a schematic view illustrating a holding-portion forming step of a method of manufacturing an air intake apparatus according to the first embodiment of the invention.

First, the intake duct 1 is formed by resin blow molding. A parison (not shown) made of PP is formed. This parison is disposed in a blow molding die (not shown). Then, air is injected into the parison. Subsequently, the parison is cooled and solidified. Thus, a first molding product 10 of the intake duct 1 is molded. FIG. 3 is a view showing the first molding product 10. In this first molding product 10, a part, in which the opening 5 is to be formed, is projected toward the outside thereof like a bag. This part constitutes a bag portion 11. A projecting base part 12 and a projecting end part 13 of the bag portion 11 are adapted so that these parts are shaped like rings, whose diameters are reduced, as compared with the rest of the bag portion 11. A projecting middle part 15 serving as an intermediate part between the projecting base part 12 and the projecting end part 13 is formed into a shape whose diameter is once increased as compared with those of the projecting base part 12 and the projecting end part 13.

Figure 4:
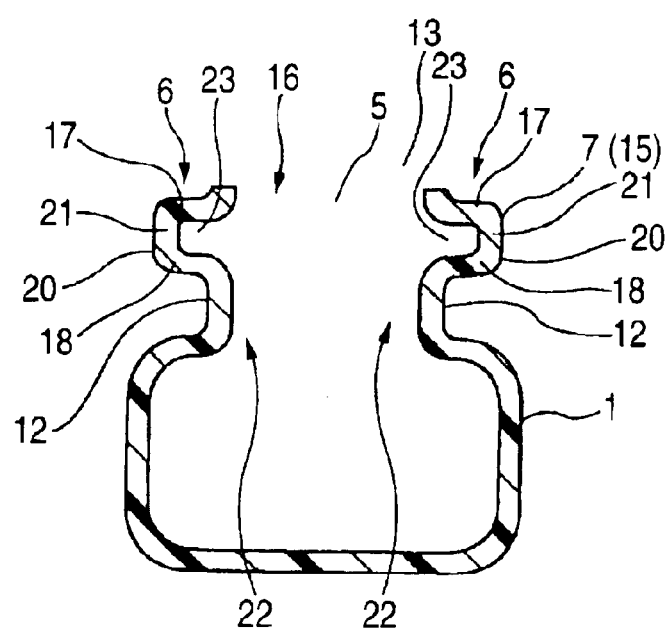
FIG. 4 is another schematic view illustrating the holding-portion forming step of the method of manufacturing an air intake apparatus according to the first embodiment of the invention.

The opening 5 is formed by cutting the projecting end part 13 of the bag portion 11 at a position of line B–B' shown in. FIG. 3. The intake duct 1, which is integral with a holding portion 7 shown in FIG. 4, is formed by this cutting. The formed opening 5 has a shape curved along the curved surface 3 of the intake duct 1. An outer edge part 6 of the opening 5 is constituted by the projecting middle part 15. Therefore, in the first embodiment, this projecting middle part 15 constitutes the holding portion 7. The holding portion 7 is formed in such a way as to be shaped substantially like a ring. The inside 16 of the ring communicates with that of the intake duct 1. A part of the holding portion 7, which is provided at the side of the projecting end part 13, serves as a top holding part 17. Another part of the holding portion 7, which is provided at the side of the projecting base part 12, serves as a bottom holding part 18. Another part of the holding portion 7, which protrudes outwardly from an outer edge 20 of the bottom holding part 18 and connects the top holding part 17 and the bottom holding part 18, serves as a side holding part 21. The bottom holding part 18, the side holding part 21, and the top holding part 17 are arranged so that the cross sections of these parts constitute a substantially U-shaped cross section. Thus, in a part having the U-shaped cross section, that is, a part of an inner peripheral part 22 of the holding portion 7, which is opposed to the side holding part 21, serves as a groove part 23.

Temporarily Fixing Step

Figure 5:
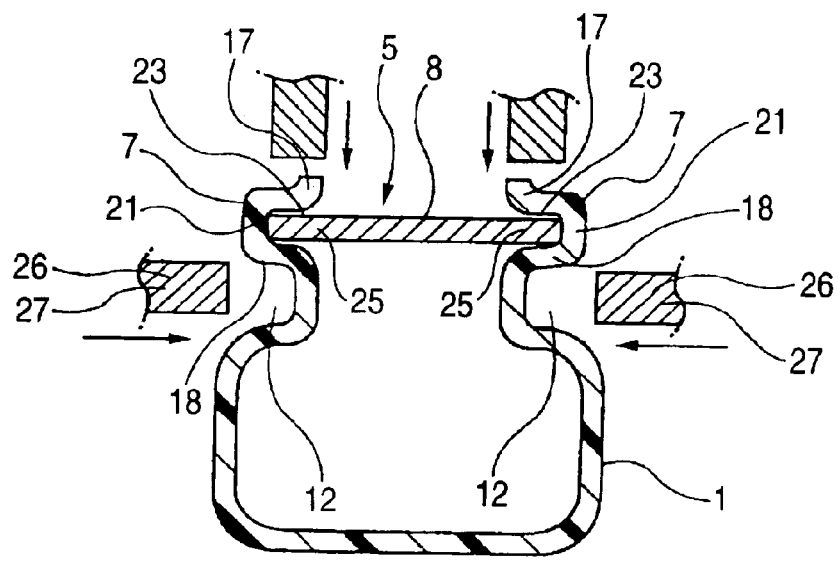
FIG. 5 is a schematic view illustrating a temporarily fixing step of the method of manufacturing an air intake apparatus according to the first embodiment of the invention.

The porous member 8 is held by the holding portion 7 formed in the holding-portion forming step. The porous member 8 is formed by employing a nonwoven fabric, which is constituted by thermoplastic resin fibers, as a material thereof and cutting this nonwoven fabric into a shape that is slightly larger than the opening 5. The porous member 8 is held by the holding portion 7 so that the peripheral portion 25 of the porous member 8 is inserted into the groove part 23 of the holding portion 7, as shown in FIG. 5. At that time, the peripheral portion 25 of the porous member 8 is held by the bottom holding part 18 and the side holding part 21. The movement of the porous member 8 toward the outside of the intake duct 1 is regulated by the top holding part 17. Thus, the temporarily fixing of the porous member 8 is completed.

Joining Step

Figure 6:
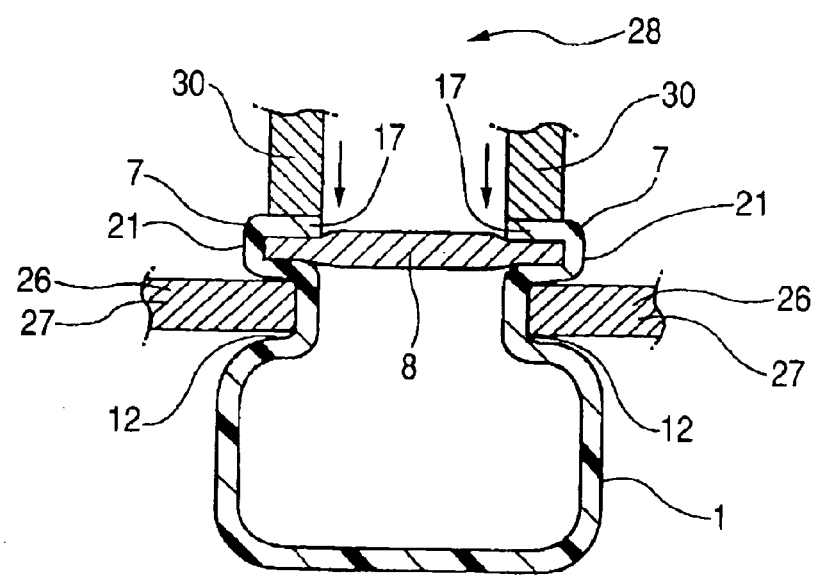
FIG. 6 is a schematic view illustrating a joining step of the method of manufacturing an air intake apparatus according to the first embodiment of the invention.

In a state in which the porous member 8 is held by and temporarily fixed to the holding portion 7 in the temporarily fixing step, the porous member 8 and the holding portion 7 are joined by welding. In the first embodiment, the welding is performed by hot-plate welding that is illustrated in FIG. 6.

First, a jig 26 for hot-plate welding is inserted into the projecting base part 12. This jig 26 for hot-plate welding consists of two separate elements 27 obtained by bisecting the shape thereof corresponding to the shape of the projecting base part 12. Each of these two separate elements 27 is inserted into the projecting base part 12 to thereby fix the entire circumference of the projecting base part 12.

Subsequently, the holding portion 7 holding the porous member 8 is pushed toward the jig 26 for hot-plate welding while heated by a welding device 28. Thus, the welding of the porous member 8 and the holding portion 7 is performed. The welding device 28 has a hot plate 30 that is shaped substantially like a ring corresponding to the shape of the holding portion 7. The welding device 28 having the hot plate 30, whose surface made to abut against the holding portion 7 is shaped substantially like a plate, is used. The porous member 8 and the holding portion 7 are deformed in the direction of the jig 26 for hot-plate welding by pushed while heated by the hot plate 30 of the welding device 28. Thus, mainly the top holding part 17 and the side holding part 21 are molten and welded to the porous member 8. Incidentally, the jig 26 for hot-plate welding is not heated. Thus, the melting of the holding portion 7 and the porous member 8 is performed only from the side of the hot plate 30. The holding portion 7 is not entirely molten.

Figure 7:
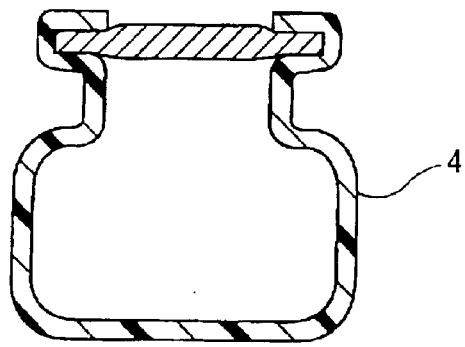
FIG. 7 is a schematic view illustrating an air intake apparatus according to the invention, which is manufactured by the method of manufacturing an air intake apparatus according to the first embodiment of the invention.

Upon completion of welding, the hot plate 30 and the jig 26 for hot-plate welding are removed from the intake duct 1. Then, the welded holding portion 7 and the welded porous member 8 are cooled and solidified. Thus, the air intake apparatus 4 according to the first embodiment shown in FIG. 7 is obtained.

According to the method of manufacturing an air intake apparatus according to the first embodiment, during a state in which the porous member 8 is held by the holding portion 7 in the temporarily fixing step and in which the placement position of the porous member 8 with respect to the opening 5 is regulated, the welding between the porous member 8 and the holding portion 7, that is, the welding between the porous member 8 and an outer edge 6 of the opening 5 is performed. Consequently, the opening 5 can easily and reliably be covered with the porous member 8 in the joining step without using a special jig for holding the porous member 8.

According to the intake apparatus of the first embodiment, the peripheral portion 25 of the porous member 8 is held in the groove part 23 of the holding portion 7 and doubly sealed by the bottom holding part 18, the side holding part 21, and the top holding part 17. Therefore, the sealing by the porous member 8 and the holding portion 7, which is the outer edge part 6 of the opening 5, is more reliably performed. Consequently, intake noise can more reliably be reduced.

Second Embodiment

A method of manufacturing an air intake apparatus according to a second embodiment of the invention is similar to the method of manufacturing an air intake apparatus according to the first embodiment of the invention, except for the shape of the holding portion, and except that the porous member and the holding portion are partly welded to each other in the temporarily fixing step. The air intake apparatus according to the second embodiment has a shape similar to that of the air intake apparatus according to the first embodiment. FIGS. 8 to 12 are schematic views illustrating the method of manufacturing the air intake apparatus according to the second embodiment.

Holding-Portion Forming Step

Figure 8:
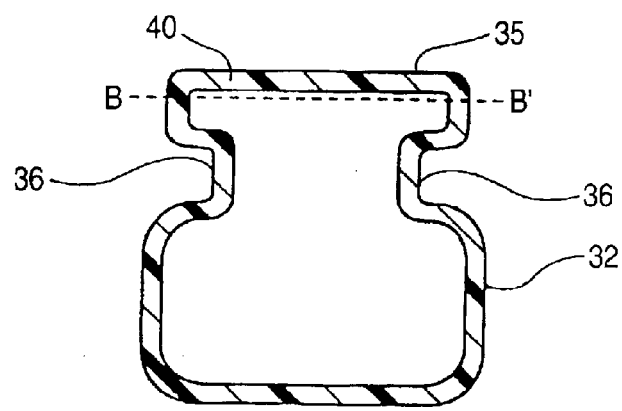
FIG. 8 is a schematic view illustrating a holding-portion forming step of a method of manufacturing an air intake apparatus according to a second embodiment of the invention.

First, an intake duct 31 is formed by resin blow molding. A parison (not shown) made of PP is formed, similarly as the parison used in the first embodiment. The formed parison is disposed in a blow molding die (not shown). Then, air is injected into the parison. Subsequently, the parison is cooled and solidified. Thus, a first molding product 32 of the intake duct 31 is molded. FIG. 8 is a view showing the first molding product 32. In this first molding product 32, a part, in which an opening 33 is to be formed, is formed as a bag portion 35 projected toward the outside thereof like a bag. This bag portion 35 is formed so that a projecting base part 36 is formed like a ring, whose diameter is reduced, as compared with the rest of the bag portion 35.

Figure 9:
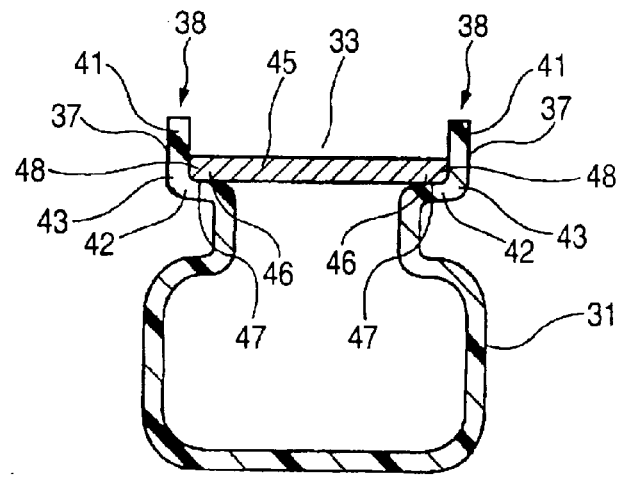
FIG. 9 is a schematic view illustrating a temporarily fixing step of the method of manufacturing an air intake apparatus according to the second embodiment of the invention.

The opening 33 is formed by cutting a projecting end part 40 of the bag portion 35 at a position of line B–B' shown in FIG. 8. The intake duct 31, which is integral with a holding portion 37 shown in FIG. 9, is formed by this cutting. The formed opening 33 has a shape curved along the curved surface of the intake duct 31, similarly to the first embodiment. An outer edge part 38 of the opening 33 is constituted by a part of the projecting end part 40, which is positioned closer to the side of a projecting base part 36 than the line B–B'. Therefore, this part constitutes the holding portion 37. The holding portion 37 is formed in such a way as to be shaped substantially like a ring. The inside of the ring communicates with that of the intake duct 31. A part of the holding portion 37, which is provided at the side of the projecting end part 40, serves as a side holding part 41. Another part of the holding portion 37, which is provided at the side of the projecting base part 36, serves as a bottom holding part 42. The side holding part 41 extends in a substantially perpendicular direction from the outer edge 43 of the bottom holding part 42 toward the outside of the intake duct 31.

Temporarily Fixing Step

The porous member 45 is held by the holding portion 37 formed in the holding-portion forming step. The porous member 45 is similar to that used in the first embodiment. The porous member 45 is held by the holding portion 37 so that the porous member 45 is inserted into the holding portion 37, as shown in FIG. 9. At that time, a bottom surface 47 of a peripheral portion 46 of the porous member 45 is put on the bottom holding part 42. The entirety of a side surface 48 is held by the side holding part 41. Thus, the porous member 45 is held by the holding portion 37 in such a manner as to hold two surfaces of the porous member 45. Consequently, the placement position of the porous member 45 with respect to the opening 33 is regulated.

In the case of the second embodiment, the porous member 45 and the holding portion 37 are partly welded to each other by ultrasonic welding using an ultrasonic horn 50, as shown in FIG. 10, after the porous member 45 is temporarily fixed by the holding portion 37. This partial welding is performed thereon by using the ultrasonic horn 50 to thereby melt the porous member 45 while pushed in the direction of the bottom holding part 42. Additionally, this partial welding is performed thereon at predetermined intervals along the peripheral portion of the porous member 45. The temporarily fixing of the porous member 45 by the holding portion 37 is made by this partial welding to be more secure.

Joining Step

In a state in which the porous member 45 is held by and temporarily fixed to the holding portion 37 in the temporarily fixing step, the porous member 45 and the holding portion 37 are joined by welding. Similarly to the first embodiment, the welding is performed by the hot-plate welding.

As illustrated in FIG. 11, similarly to the first embodiment, first, a jig 61 for hot-plate welding is inserted into the projecting base part 36. Subsequently, the holding portion 37 holding the porous member 45 is pushed toward the jig 51 for hot-plate welding while heated by a hot plate 52. Thus, the welding of the porous member 45 and the holding portion 37 is performed. A welding device 53 used in the second embodiment is almost the same as that used in the first embodiment. A surface of the hot plate 52, which is made to abut against the holding portion 37, differs in shape from that of the hot plate 30 used in the first embodiment. That is, a substantially-ring-like concave portion 55, whose shape corresponds to the product shape of the holding portion 37, is formed in a part of the hot plate 52, which faces the holding portion 37. Therefore, at the time of welding thereof, a part of the side holding part 41, which is placed at the side of the projecting end part 40, is pushed by the hot plate 52, and guided by the concave portion 55. This part of the side holding part 41 is molten by simultaneously being deformed in such a way as to bend toward a surface 56 of the porous member 45. Therefore, a part of the bent and deformed side holding part 41 is welded to the porous member 45 by simultaneously being stacked on the surface 56 of the porous member 45.

Figure 12:
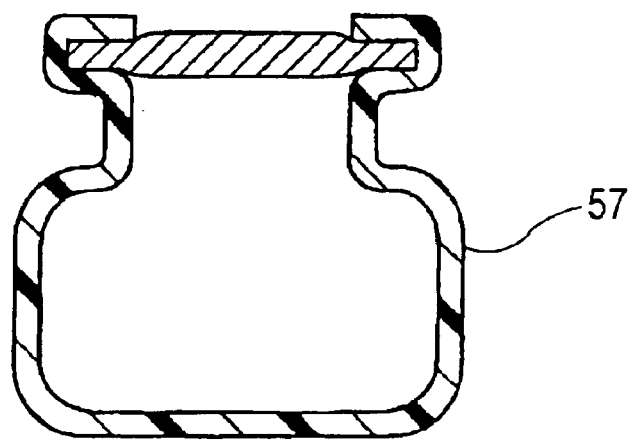
FIG. 12 is a schematic view illustrating an air intake apparatus according to the invention, which is manufactured by the method of manufacturing an air intake apparatus according to the second embodiment of the invention.

Upon completion of welding, the hot plate 52 and the jig 51 for hot-plate welding are removed from the intake duct 31. Then, the welded holding portion 37 and the welded porous member 45 are cooled and solidified. Thus, the air intake apparatus 57 according to the second embodiment shown in FIG. 12 is obtained.

According to the method of manufacturing an air intake apparatus according to the second embodiment, similarly to the first embodiment, during a state in which the porous member 45 is held by the holding portion 37 in the temporarily fixing step and in which the placement position of the porous member 45 with respect to the opening 33 is regulated, the welding between the porous member 45 and the holding portion 37, that is, the welding between the porous member 45 and an outer edge 38 of the opening 33 is performed. Consequently, the opening 33 can easily and reliably be covered with the porous member 45 in the joining step without using a special jig for holding the porous member 45. Additionally, because the porous member 45 and the holding portion 37 are partly welded to each other, the holding of the porous member 45 by the holding portion 37 is made by this partial welding to be more secure.

According to the intake apparatus 57 of the second embodiment, similarly to the first embodiment, the joining between the porous member 45 and the holding portion 37, which is the outer edge part 38 of the opening 33, is more reliably performed. Consequently, the intake noise can more reliably be reduced.

Third Embodiment

Figure 13:
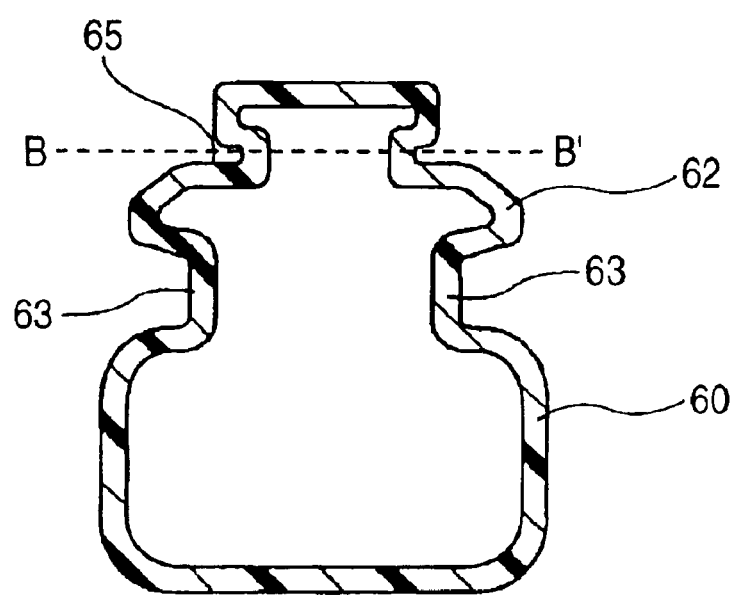
FIG. 13 is a schematic view illustrating a holding-portion forming step of a method of manufacturing an air intake apparatus according to a third embodiment of the invention.
Figure 14:
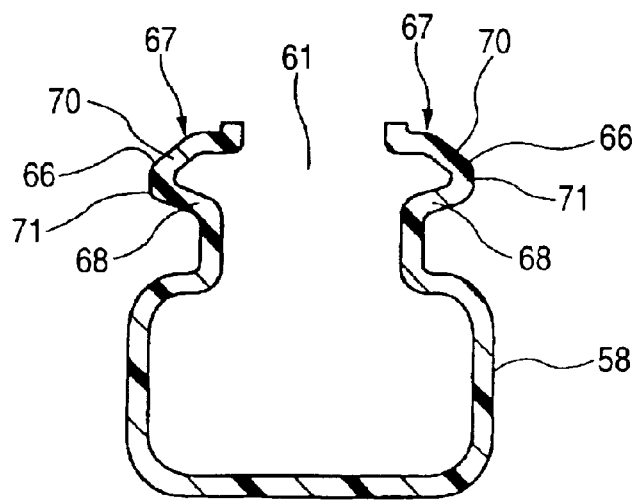
FIG. 14 is another schematic view illustrating the holding-portion forming step of the method of manufacturing an air intake apparatus according to the third embodiment of the invention.
Figure 15:
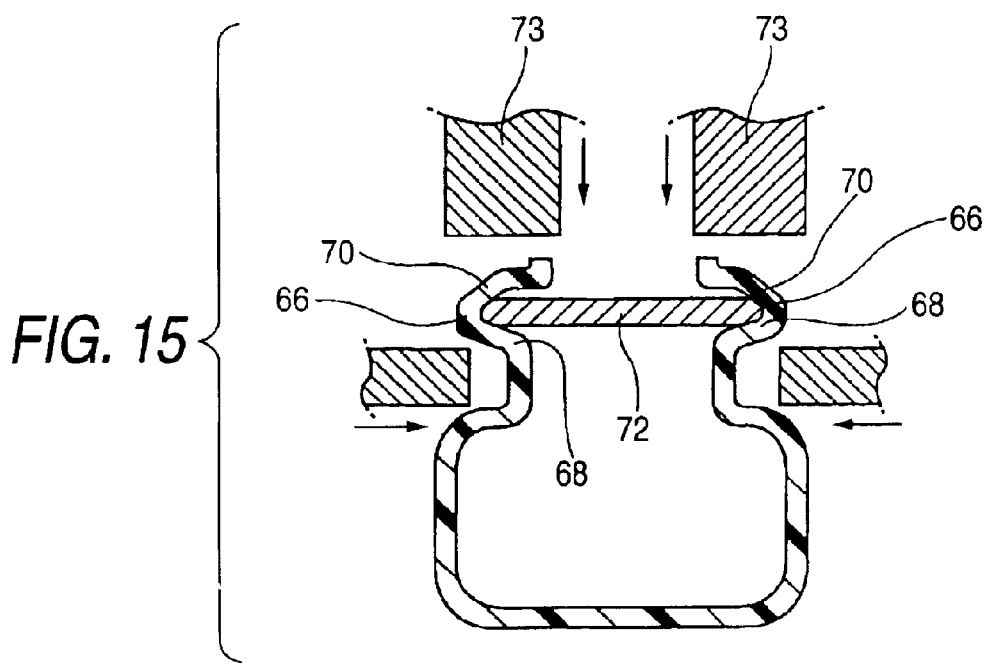
FIG. 15 is a schematic view illustrating a temporarily fixing step of the method of manufacturing an air intake apparatus according to the third embodiment of the invention.

A method of manufacturing an air intake apparatus according to a third embodiment of the invention is similar to the method of manufacturing an air intake apparatus according to the first embodiment of the invention, except for the shape of the holding portion. The air intake apparatus according to the third embodiment has a shape similar to that of the air intake apparatus according to the first embodiment. FIGS. 13 to 15 are schematic views illustrating the method of manufacturing the air intake apparatus according to the third embodiment.

Holding-Portion Forming Step

First, an intake duct 58 is formed by resin blow molding. A parison (not shown) made of PP is formed, similarly as the parison used in the first embodiment. The formed parison is disposed in a blow molding die (not shown). Then, air is injected into the parison. Subsequently, the parison is cooled and solidified. Thus, a first molding product 60 of the intake duct 58 is molded. FIG. 13 is a view showing the first molding product 60. In this first molding product 60, a part, in which an opening 61 is to be formed, is formed as a bag portion 62 projected toward the outside thereof like a bag. This bag portion 62 is formed so that a projecting base part 63 is formed like a ring, whose diameter is reduced, as compared with the rest of the bag portion 35, and that a projecting end part 65 is formed in such a way as to be inclined by simultaneously and gradually decrease the diameter thereof.

The opening 61 is formed by cutting the projecting end part 65 of the bag portion 35 at a position of line B–B' shown in FIG. 13. The intake duct 58, which is integral with a holding portion 66 shown in FIG. 14, is formed by this cutting. The formed opening 58 has a shape curved along the curved surface of the intake duct 58, similarly to the first embodiment. An outer edge part 67 of the opening 33 is constituted by a part of the projecting end part 40, which is positioned closer to the side of a projecting base part 36 than the line B–B'. Therefore, this part constitutes the holding portion 66. The holding portion 66 consists of a bottom holding part 68 and a side holding part 70, similarly to that of the first embodiment. The side holding part 70 of the holding portion 66 projects from the outer edge 71 of the bottom holding part 68 in such a way as to be inclined in the direction of the diameter of the ring (i.e., direction of the diameter of the opening).

Temporarily Fixing Step

In the third embodiment, the temporarily fixing step is performed, similarly to that of the first embodiment. That is, because the side holding part 70 is projected by simultaneously and gradually being inclined in the direction of the ring, as shown in FIG. 15, a porous member 72 is held and sandwiched by the bottom holding part 68 and the side holding part 70. Therefore, the holding of the porous member 72 by the holding portion 66 is easily and reliably performed.

Joining Step

In the third embodiment, the joining step is performed, similarly to that of the first embodiment. That is, because the side holding part 70 is inclined in the direction of a diameter of the ring, the side holding part 70 is deformed by being bent in this direction in which the side holding portion 70 is inclined. Therefore, this step can be performed by using a welding device that has a hot plate 73 shaped like a plate.

According to the method of manufacturing an air intake apparatus according to the third embodiment, similarly to the first embodiment, during a state in which the porous member 72 is held by the holding portion 66 in the temporarily fixing step and in which the placement position of the porous member 72 with respect to the opening 61 is regulated, the welding between the porous member 72 and the holding portion 66, that is, the welding between the porous member 72 and an outer edge 67 of the opening 61 is performed. Consequently, the opening 61 can easily and reliably be covered with the porous member 72 in the joining step without using a special jig for holding the porous member 72.

According to the intake apparatus 75 of the third embodiment, similarly to the first embodiment, the joining between the porous member 72 and the holding portion 67, which is the outer edge part 67 of the opening 61, is more reliably performed. Consequently, the intake noise can more reliably be reduced.

As described above, according to the method of manufacturing an air intake apparatus of the invention, the porous member is held and temporarily fixed in the temporarily fixing step by the holding portion. Thus, the placement position of the porous member with respect to the opening can be regulated by the holding portion. Therefore, the opening can reliably be covered with the porous member, regardless of the shape of the opening. Regulation on the placement position of the porous member with respect to the opening can be performed without using any special jig. Consequently, the manufacturing cost of an air intake apparatus can be reduced.

In the temporarily fixing step, the porous member is merely held by the holding portion and temporarily fixed at a place corresponding to the opening. Therefore, in a case where the placement position of the porous member with respect to the opening is displaced, the porous member can be removed from the holding portion. Thus, the placement position of the porous member can easily be corrected. Consequently, a manufacturing loss is reduced. Hence, the manufacturing cost of an air intake apparatus can be reduced still more.

According to the air intake apparatus of the invention, the peripheral portion of the porous member is doubly sealed with the holding portion. Thus, an occurrence of a gap between the outer edge part of the opening and the porous member can be prevented. Consequently, intake noise can more reliably be reduced.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of manufacturing an air intake apparatus that has an air intake passage portion constituting a path of flow of air introduced into an internal combustion engine, an opening formed in at least a part of the air intake passage portion for communicating outside and inside thereof, and a porous member for covering said opening, said method comprising steps of:

forming said opening in said air intake passage portion;

forming a holding portion projecting toward the outside of said air intake passage portion on an outer edge part of said opening;

temporarily fixing said porous member by inserting said porous member into said holding portion and by causing said holding portion to hold said porous member; and joining said porous member and said holding portion during a state in which said porous member is temporarily fixed in said holding portion.

2. A method according to claim 1, wherein said holding portion is formed while extending along an outer edge of said opening and has a bottom holding part, which holds a part of a bottom surface of said porous member, and a side holding part that projects from an outer edge of said bottom holding part to outside of said air intake passage portion and that holds at least a part of a side surface of said porous member, and wherein in said step of temporarily fixing, at least two surfaces of said porous member are held by said holding portion.

3. A method according to claim 2, wherein in said step of temporarily fixing, a peripheral portion of said porous member is joined with said bottom holding part by welding.

4. A method according to claim 3, wherein said welding is performed by ultrasonic welding using an ultrasonic horn.

5. A method according to claim 1, wherein said holding portion is formed while extending along an outer edge of said opening and also has a bottom holding part that holds a part of a bottom surface of said porous member, a side holding part that projects from an outer edge of said bottom holding part to outside of said air intake passage portion and that holds at least a part of a side surface of said porous member, and a top holding part that projects from a projecting end of said side holding part and that extends in a direction of a diameter of said opening, wherein said bottom holding part, said side holding part, and said top holding part are disposed so that cross sections of said bottom holding part, said side holding part, and said top holding part are arranged in a substantially U-shaped configuration in such a way as to have a groove part provided in an inner peripheral part of said holding portion, and wherein in said step of fixing, said porous member is held in said porous member is held in said groove part of said holding portion.

6. A method according to claim 1, wherein said holding portion is formed while extending along an outer edged of said opening and also has a bottom holding part that holds a part of a bottom surface of said porous member, a side holding part that projects from an outer edge of said bottom holding part in such a way as to be inclined in a direction of a diameter of said opening.

7. A method according to claim 1, wherein in said step of joining, the joining of said porous member and said holding portion is performed by welding.

8. A method according to claim 1, wherein in said step of joining, the joining of said porous member and said holding portion is performed by thermal caulking.

9. A method according to claim 1, wherein said porous member is formed by thermoplastic resin fibers.

10. A method according to claim 9, wherein said porous member is formed by shaping a nonwoven fabric formed of said thermoplastic resin fibers.

11. An air intake apparatus comprising:

an air intake passage portion constituting a path of flow of air introduced into an internal combustion engine;

an opening formed in at least a part of said air intake passage portion for communicating outside and inside thereof;

a porous member for covering said opening; and a holding portion projecting toward the outside of said air intake passage portion on an outer edge part of said opening, wherein said holding portion has a substantially U-shaped cross section and also has a groove part provided in an inner peripheral part thereof; and said porous member is joined and integrally formed with said holding portion so that a peripheral portion of said porous member is held in said groove part.

12. An air intake apparatus according to claim 11, wherein said porous member is formed by thermoplastic resin fibers.

13. An air intake apparatus according to claim 12, wherein said porous member is formed by shaping a nonwoven fabric formed of said thermoplastic resin fibers.

* * * * *